US008913320B2

(12) United States Patent
Davis et al.

(10) Patent No.: US 8,913,320 B2
(45) Date of Patent: Dec. 16, 2014

(54) WIRE GRID POLARIZER WITH BORDERED SECTIONS

(75) Inventors: Mark Alan Davis, Springville, UT (US); Vern W. Bangerter, Salem, UT (US)

(73) Assignee: Moxtek, Inc., Orem, UT (US)

( * ) Notice: Subject to any disclaimer, the term of this patent is extended or adjusted under 35 U.S.C. 154(b) by 331 days.

(21) Appl. No.: 13/567,760

(22) Filed: Aug. 6, 2012

(65) Prior Publication Data

US 2013/0201557 A1     Aug. 8, 2013

Related U.S. Application Data

(63) Continuation-in-part of application No. 13/430,945, filed on Mar. 27, 2012.

(60) Provisional application No. 61/487,061, filed on May 17, 2011.

(51) Int. Cl.
*G02B 5/30*          (2006.01)

(52) U.S. Cl.
CPC .................................... *G02B 5/3058* (2013.01)
USPC .............................. 359/485.05; 359/487.03

(58) Field of Classification Search
CPC ................... G02B 5/3058; G02F 2001/133548
USPC ........................................ 359/485.05, 487.03
See application file for complete search history.

(56) References Cited

U.S. PATENT DOCUMENTS

| 2,224,214 A | 12/1940 | Brown |
| 2,237,567 A | 4/1941 | Land |
| 2,287,598 A | 6/1942 | Brown |
| 2,391,451 A | 12/1945 | Fischer |
| 2,403,731 A | 7/1946 | MacNeille |
| 2,605,352 A | 7/1952 | Fishcer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |

(Continued)

FOREIGN PATENT DOCUMENTS

| AU | 2003267964 | 12/2003 |
| CH | 0296391 | 2/1954 |

(Continued)

OTHER PUBLICATIONS

Lloyd William Taylor, Manual of Advanced Undergraduate Experiments in Physics, p. 302 (1959).

(Continued)

*Primary Examiner* — Frank Font
(74) *Attorney, Agent, or Firm* — Thorpe North & Western LLP

(57) ABSTRACT

A wire grid polarizer comprising a transparent substrate having a first surface. Multiple separate and discrete sections of wire grids can be disposed over the first surface and attached to the substrate, with a border between the sections including an opaque mask material. The mask material can be disposed over the first surface of the substrate. The mask material can be a material different than the wire grid material. The mask material can extend over or under a portion of an edge of the wire grid.

20 Claims, 4 Drawing Sheets

(56) References Cited

U.S. PATENT DOCUMENTS

| | | |
|---|---|---|
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu et al. |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |

(56) References Cited

U.S. PATENT DOCUMENTS

| | | | |
|---|---|---|---|
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,864,427 A | 1/1999 | Fukano et al. |
| 5,872,653 A | 2/1999 | Schrenk et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,049,428 A | 4/2000 | Khan et al. |
| 6,053,616 A | 4/2000 | Fujimori et al. |
| 6,055,103 A | 4/2000 | Woodgate et al. |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,100,928 A | 8/2000 | Hata |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Okumuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | TadicGaleb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komura et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B1 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,707,595 B2 * | 3/2004 | Kutz et al. ............ 359/291 |
| 6,710,921 B2 | 3/2004 | Hansen et al. |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |

(56) References Cited

U.S. PATENT DOCUMENTS

| | | |
|---|---|---|
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,374 B2 | 11/2006 | Cheng |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 * | 10/2010 | Perkins et al. ............ 359/485.05 |
| 7,944,544 B2 | 5/2011 | Amako et al. |
| 7,961,393 B2 | 6/2011 | Perkins et al. |
| 8,009,355 B2 | 8/2011 | Nakai |
| 8,027,087 B2 | 9/2011 | Perkins et al. |
| 8,248,697 B2 * | 8/2012 | Kenmochi ............... 359/485.05 |
| 8,493,658 B2 * | 7/2013 | Nishida et al. ........... 359/485.05 |
| 8,611,007 B2 * | 12/2013 | Davis ....................... 359/485.05 |
| 8,619,215 B2 * | 12/2013 | Kumai ............................ 349/96 |
| 8,696,131 B2 * | 4/2014 | Sawaki ............................ 353/20 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hanson |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |

(56) References Cited

U.S. PATENT DOCUMENTS

| | | | |
|---|---|---|---|
| 2007/0242187 A1 | 10/2007 | Yamaki et al. | |
| 2007/0242228 A1 | 10/2007 | Chen et al. | |
| 2007/0242352 A1 | 10/2007 | MacMaster | |
| 2007/0297052 A1 | 12/2007 | Wang et al. | |
| 2008/0037101 A1 | 2/2008 | Jagannathan et al. | |
| 2008/0038467 A1 | 2/2008 | Jagannathan et al. | |
| 2008/0055549 A1 | 3/2008 | Perkins | |
| 2008/0055719 A1 | 3/2008 | Perkins | |
| 2008/0055720 A1 | 3/2008 | Perkins | |
| 2008/0055721 A1 | 3/2008 | Perkins | |
| 2008/0055722 A1 | 3/2008 | Perkins et al. | |
| 2008/0055723 A1* | 3/2008 | Gardner et al. | 359/486 |
| 2008/0094547 A1 | 4/2008 | Sugita et al. | |
| 2008/0316599 A1 | 12/2008 | Wang et al. | |
| 2009/0009865 A1* | 1/2009 | Nishida et al. | 359/486 |
| 2009/0040607 A1 | 2/2009 | Amako et al. | |
| 2009/0041971 A1 | 2/2009 | Wang et al. | |
| 2009/0053655 A1 | 2/2009 | Deng et al. | |
| 2009/0109377 A1 | 4/2009 | Sawaki et al. | |
| 2010/0103517 A1 | 4/2010 | Davis et al. | |
| 2010/0188747 A1* | 7/2010 | Amako et al. | 359/486 |
| 2010/0225832 A1* | 9/2010 | Kumai | 349/8 |
| 2010/0239828 A1 | 9/2010 | Cornaby et al. | |
| 2010/0328767 A1 | 12/2010 | Kato | |
| 2010/0328768 A1 | 12/2010 | Lines | |
| 2010/0328769 A1 | 12/2010 | Perkins | |
| 2011/0080640 A1 | 4/2011 | Kaida et al. | |
| 2011/0096396 A1 | 4/2011 | Kaida et al. | |
| 2012/0008205 A1 | 1/2012 | Perkins et al. | |
| 2012/0075699 A1 | 3/2012 | Davis | |

FOREIGN PATENT DOCUMENTS

| | | |
|---|---|---|
| CN | 1692291 | 11/2005 |
| DE | 296391 | 2/1950 |
| DE | 3707984 A1 | 9/1988 |
| DE | 10327963 | 1/2005 |
| DE | 10341596 | 4/2005 |
| DE | 10 2004 04122 | 3/2006 |
| EP | 407830 B1 | 1/1991 |
| EP | 0731456 | 9/1996 |
| EP | 1239308 | 2/2002 |
| JP | 56156815 | 12/1981 |
| JP | 58-042003 | 3/1983 |
| JP | 61122626 | 6/1986 |
| JP | 1028675 | 1/1989 |
| JP | 02-308106 | 12/1990 |
| JP | 2308106 | 12/1990 |
| JP | 3005706 | 1/1991 |
| JP | H03084502 | 4/1991 |
| JP | 3126910 | 5/1991 |
| JP | 04 366916 | 6/1991 |
| JP | 4-12241 | 1/1992 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | 06-174907 | 6/1994 |
| JP | 6202042 | 7/1994 |
| JP | 7005316 | 1/1995 |
| JP | H0772428 | 3/1995 |
| JP | 7-146469 | 6/1995 |
| JP | 7202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 11-014814 | 1/1999 |
| JP | 1-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000-147487 | 5/2000 |
| JP | 2000284117 | 10/2000 |
| JP | 2001074935 | 3/2001 |
| JP | 2003502708 | 1/2003 |
| JP | 2004157159 | 6/2004 |
| JP | 2004309903 | 11/2004 |
| JP | 2005151154 | 5/2005 |
| JP | 20054513547 | 5/2005 |
| JP | 2005195824 | 7/2005 |
| JP | 2006047813 | 2/2006 |
| JP | 2006-133402 | 5/2006 |
| JP | 2006201540 | 8/2006 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| SU | 1283685 | 1/1987 |
| SU | 1781659 A1 | 12/1992 |
| WO | WO96/15474 | 5/1996 |
| WO | WO 99/59005 | 11/1999 |
| WO | WO0070386 | 11/2000 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO03/107046 | 12/2003 |
| WO | WO2004013684 | 2/2004 |
| WO | WO2005/065182 | 7/2005 |
| WO | WO2005/101112 | 10/2005 |
| WO | WO2006/014408 | 2/2006 |
| WO | WO 2006/036546 | 4/2006 |

OTHER PUBLICATIONS

Flanders, "Application of .100 Å linewidth structures fabricated by shadowing techniques." J. Vac. Sci. Technol., 19(4), Nov./Dec. 1981.

Kuta et al. "Coupled-wave analysis of lamellar metal transmission gratings for the visible and the infrared." J. Opt. Soc. Am. A/vol. 12, No. 5 /May 1995.

Lochbihler et al. "Diffraction from highly conducting wire gratings of arbitrary cross-section." Journal of Modern Optics, 1993, vol. 40, No. 7, pp. 1273-1298.

Novak et al., "Far infrared polarizing grids for use at cryogenic temperatures." Applied Optics, Aug. 15, 1989/vol. 28, No. 15, pp. 3425-3427.

Auton et al, "Grid Polarizers for Use in the Near Infrared." Infrared Physics, 1972, vol. 12, pp. 95-100.

Stenkamp et al, "Grid polarizer for the visible spectral region." SPIE vol. 2213 pp. 288-296.

Handbook of Optics, 1978, pp. 10-68-10-77.

Handbook of Optics vol. II, $2^{nd}$ Edition, pp. 3.32-3.35.

Glytsis et al, "High-spatial-frequency binary and multilevel stairstep gratings: polarization-selective mirrors and broadband antireflection surfaces." Applied Optics Aug. 1, 1992 vol. 31, No. 22 pp. 4459-4470.

Auton, "Infrared Transmission Polarizers by Photolithography." Applied Optics Jun. 1967 vol. 6, No. 6, pp. 1023-1027.

Haggans et al., "Lamellar gratings as polarization components for specularly reflected beams." Journal of Modern Optics, 1993, vol. 40, No. 4, pp. 675-686.

Nordin et al., "Micropolarizer array for infrared imaging polarimetry." J. Op. Soc. Am. A. vol. 16 No. 5, May 1999.

Bird et al., "The Wire Grid as a Near-Infrared Polarizer." J. Op. Soc. Am. vol. 50 No. 9 (1960).

(56) References Cited

OTHER PUBLICATIONS

Optics $9^{th}$ Edition, pp. 338-339 (1980).
Whitbourn et al, "Phase shifts in transmission line models of thin periodic metal grids." Applied Optics Aug. 15, 1989 vol. 28, No. 15, pp. 3511-3515.
Enger et al, "Optical elements with ultrahigh spatial-frequency surface corrugations." Applied Optics Oct. 15, 1983, vol. 22, No. 20 pp. 3220-3228.
Knop, "Reflection Grating Polarizer for the Infrared." Optics Communications vol. 26, No. 3, Sep. 1978.
Hass et al, "Sheet Infrared Transmission Polarizers." Applied Optics Aug. 1965, vol. 4, No. 8 pp. 1027-1031.
Flanders, "Submicron periodicity gratings as artificial anisotropic dielectrics." Appl. Phys. Lett. 42 (6), Mar. 15, 1983, pp. 492-494.
Li Li et al, "Visible broadband, wide-angle, thin-film multilayer polarizing beam splitter." Applied Optics May 1, 1996, vol. 35, No. 13, pp. 2221-2224.
Sonek et al., "Ultraviolet grating polarizers." J. Vac. Sci. Technol., 19(4), Nov./Dec. 1981, pp. 921-923.
N.M. Ceglio, Invited Review "Revolution in X-Ray Optics." J. X-Ray Science & Tech. 1, 7-78 (1989).
Dainty, et al, "Measurements of light scattering by characterized random rough surface." Waves in Random Media 3 (1991).
DeSanto et al, "Rough surface scattering." Waves in Random Media 1 (1991).
Lavin, "Specular Reflection." Monographs on App. Opt. No. 2.
Zanzucchi et al., "Corrosion Inhibitors for Aluminum Films." David Sarnoff Research Center, Princeton, NJ 08543-5300.
Moshier et al. "The Corrosion and Passively of Aluminum Exposed to Dilute Sodium Sulfate Solutions." Corrosion Science vol. 27. No. 8 pp. 785-801 1987.
Scandurra, et al. "Corrosion Inhibition of Al Metal in Microelectronic Devices Assemble in Plastic Packages." Journal of the Electrochemical Society, 148 (8) B289-B292 (2001).
Takano, Kuniyoshi et al. "Cube polarizers by the use of metal particles in anodic alumina films." Applied Optics, vol. 33, No. 16, 3507-3512, Jun. 1, 1994.
Lopez, et al. "Wave-plate polarizing beam splitter based on a form-birefringent multilayer grating." Optics Letters, vol. 23, No. 20, pp. 1627-1629, Oct. 15, 1998.
Chen, J. et al. "Optimum film compensation modes for TN and VA LCDs." SID 98 Digest, pp. 315-318, 1998.
Richter, Ivan et al. "Design considerations of form birefringent microstructures." Applied Optics, vol. 34, No. 14, pp. 2421-2429, May 10, 1995.
Tyan, Rong-Chung et al. "Design, fabrication, and characterization of form-birefringent multilayer polarizing beam splitter." Optical Society of America. vol. 14, No. 7, pp. 1627-1636, Jul. 1997.
Ho, G H et al. "The mechanical-optical properties of wire-grid type polarizer in projection display system." SID 02 Digest, pp. 648-651, 2002.
Kostal, Hubert, NanoTechnology "using advanced lithography to pattern nano-optics devices." www.solid-state.com, Sep. 2005, p. 26 and 29.
Kostal, Hubert "Nano-optics: robust, optical devices for demanding applications." Military & Aerospace Electronics, Jul. 2005, 6 pages.
Kostal, Hubert "Nano-optic devices enable integrated fabrication." www.laserfocuswold.com, Jun. 2004 pp. 155, 157-159.
Wang, Jian et al. "Free-Space nano-optical devices and integration: design, fabrication, and manufacturing." Bell Labs Technical Journal, 2005, pp. 107-127, vol. 10, No. 3.
Wang et al. "Diffractive optics: nanoimprint lithography enables fabrication of subwavelength optics." LaserFocusWorld, http://lfw.pennet.com/Articles/Article_Dispaly.cf . . . Apr. 19, 2009, 6 pages.
Wang et al. "High-performance nanowire-grid polarizers" Optical Society of America. 2005, pp. 195-197, vol. 30, No. 2.
Wang et al. "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.
Savas et al. "Achromatic interferometric lithography for 100-nm-period gratings and grids." Journal Vac. Sci. Technology B, Nov./Dec. 1995, pp. 2732-2735, vol. 13, No. 6.
Haisma et al. "Mold-assisted nanolithography: a process for reliable pattern replication." Journal Vac. Sci. Technology B, Nov./Dec. 1996, pp. 4124-4128, vol. 14, No. 6.
Wang et al. "High-performance large-area ultra-broadband (UV to IR) nanowire-grid polarizers and polarizing beam-splitters." Proc. of SPIE 2005, pp. 1-12, vol. 5931.
Wang et al. "Monolithically integrated isolators based on nanowire-grid polarizers." IEEE, Photonics Technology Letters, Feb. 2005, pp. 396-398, vol. 17, No. 2.
Deng et al. "Multiscale structures for polarization control by using imprint and UV lithography." Proc. of SPIE, 2005, pp 1-12. vol. 6003.
Kostal et al. "MEMS Meets Nano-optics the marriage of MEMES and nano-optics promises a new and viable platform for tunable optical filters." www.fiberoptictechnology.net, Fiber Optic Technology, Nov. 2005, pp. 8-13.
Kostal et al. "Adding parts for a greater whole." SPIE's oeMagazine, May 2003, pp. 24-26.
Deng et al. "Wideband antireflective polarizers based on integrated diffractive multilayer microstructures." Optics Letters, Feb. 1, 2006, pp. 344-346, vol. 31., No. 3.
Chen, et al. "Novel polymer patterns formed by lithographically induced self-assembly (LISA).", American Chemical Society, Jan. 2005, pp. 818-821, vol. 21, No. 3.
Park, et al. "Nano-optics redefine rules for optical processing." NanoOptic Corp, 3 pages.
Baur, "A new type of beam splitting polarizer cube." Meadowlark Optics, 2005, pp. 1-9.
Zhang et al., "A broad-angle polarization beam splitter based on a simple dielectric periodic structure." Optices Express, Oct. 29, 2007, 6 pages, vol. 15, No. 22.
Compact Disc Audio, http://hyperphusics.phy-astr.gsu.edu/hbase/audio/cdplay.html.
Robinson et al., "Wide Field of View Compensation Scheme for Cube Polarizing Beam Splitters." SID 03 Digest, pp. 1-4, www.colorlink.com.
ProFlux, www.moxtek.comm pp. 1-4.
Pentico, Eric et al., "New, High Performance, Durable Polarizers for Projection Displays." SID 01 Digest, 2001, pp. 1287-1289.
Brummelaar et al., "Beam combining optical components," Chara Technical Report, Jan. 5, 1998, pp. TR61-1 to TR 61-17, No. 61.
Bruzzone, et al.,"High-performance LCoS optical engine using cartesian polarizer technlogy," SID 03 Digest, 2003, pp. 1-4.
Fritsch, et al., "A liquid-crystal phase modulator for large-screen projection." IEEE, Sep. 1989, pp. 1882-1887, vol. 36, No. 9.
Deguzman et al., "Stacked subwavelength gratings as circular polarization filters." Applied Optices, Nov. 1, 2001, pp. 5731-5737, vol. 40, No. 31.
Tyan et al., "Polarizing beam splitter based on the anisotropic spectral reflectivity characteristic of form-birefringent multilayer gratings." Optics Letters, May 15, 1996, pp. 761-763, vol. 21, No. 10.
Tamada et al., "Aluminum-wire grid polarizer for a compact magneto-optic pickup device." 2 pages.
Maystre & Dainty, Modern Analysis of Scattering Phenomena Proceeding from International Workshop held at Domaine deTournon, Aix en Povence, France Sep. 5-8, 1990.
Wang, et al., "Innovatic High-Performance Nanowrie-Grid Polarizers and integrated Isolators, " IEEE Journal of Selected Topics in Quantum Electronics, pp. 241-253, vol. 11 No. 1 Jan./Feb. 2005.
U.S. Appl. No. 13/234,444, filed Aug. 16, 2011; Raymond T. Perkins.
U.S. Appl. No. 13/224,719, filed Sep. 2, 2011; Mark Alan Davis.
U.S. Appl. No. 13/495,269, filed Jun. 13, 2012; Michael Lines.
U.S. Appl. No. 13/430,945, filed Mar. 27, 2012; Mark Alan Davis.

\* cited by examiner

WIRE GRID POLARIZER WITH BORDERED SECTIONS

CLAIM OF PRIORITY

This is a continuation-in-part of U.S. patent application Ser. No. 13/430,945, filed on Mar. 27, 2012, which claims priority to U.S. Provisional Patent Application No. 61/487,061, filed on May 17, 2011; all of which are hereby incorporated herein by reference in their entirety.

FIELD OF THE INVENTION

The present application is related generally to wire grid polarizers, and especially wire grid polarizers with separate pixels or functionality sections.

BACKGROUND

Polarized light can improve vision systems and can be used in televisions, computer projectors, medical vision systems, military vision equipment, etc. It can be beneficial to have adjacent polarizing sections, such as adjacent wire grid polarizers, that have a difference in angular orientation of the wires between the different sections. This can allow the light to be polarized in a different direction through different sections. This difference can be used to provide real-time, multiple views of an object. For example, see U.S. Pat. Nos. 6,075,235 and 7,375,887. Although the different polarization due to different wire grid angles is helpful, it would be beneficial to have more real-time views of an object than can be provided by adjacent wire grid polarizers with different wire grid angles.

It is beneficial for a wire grid polarizer to have high transmission of one polarization Tp and low transmission of another polarization Ts. Some structural characteristics of wire grid polarizers, such as a decreased wire height h, increases both Tp, which is usually desirable, and Ts, which is usually undesirable. Other structural characteristics of wire grid polarizers, such as increased wire height h, decreases both Tp, which is usually undesirable, and Ts, which is usually desirable. Thus, there can be a trade-off between optimization of Tp and optimization of Ts. It would be beneficial to optimize for both Tp and Ts.

Polarizers optimized for one wavelength, or range of wavelengths, may not be suitable for polarization of another wavelength, or range of wavelengths. Objects appear differently under different wavelengths of light. For example, visible, ultraviolet, and infrared light emanating from an object, or even different wavelengths within visible, ultraviolet, or infrared can be detected and compared for analysis of the object. It would be beneficial to have a polarizer optimized for each of these wavelengths or wavelength ranges.

Alignment of adjacent polarizing sections can be difficult. Misalignment can adversely affect the image. Edges, and especially corners, of polarizing sections can have distorted wires that may distort the image. It would be beneficial to have a way of improving alignment of polarizing sections and to reduce or remove the distortion of wire grid polarizer section edges.

SUMMARY

It has been recognized that it would be advantageous to have improved alignment of separate polarizer sections and a reduction or elimination of light distortion caused by defects in the edges of sections. The present invention is directed to a wire grid polarizer having multiple sections or pixels that satisfies these needs.

The wire grid polarizer comprises a substrate which is transparent to incoming light and having a first surface. Multiple separate and discrete sections of wire grids can be disposed over the first surface and attached to the substrate. A border between the sections can include a mask material, disposed over the first surface of the substrate, which is opaque to incoming light, and is a material different than the wire grid material. The mask material can extend over or under a portion of an edge of the wire grid.

DETAILED DESCRIPTION

Figure 1:
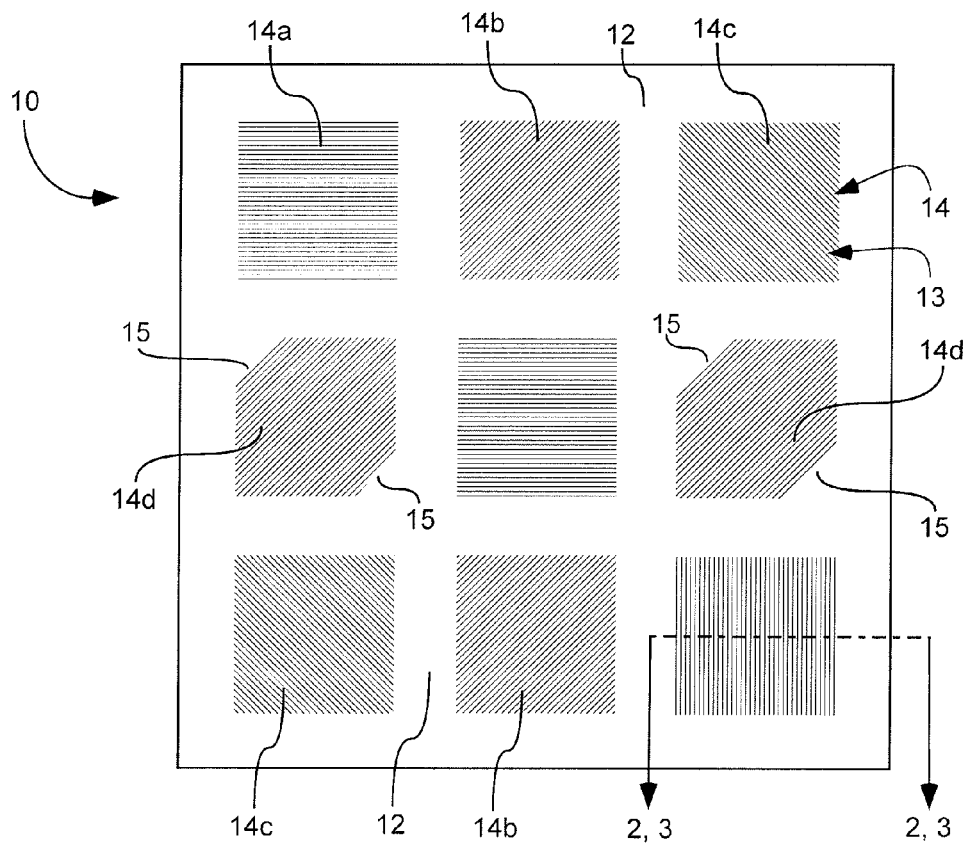
FIG. 1 is a schematic top view of a wire grid polarizer having multiple functionality sections or pixels, with a border between the sections, in accordance with an embodiment of the present invention.
Figure 2:
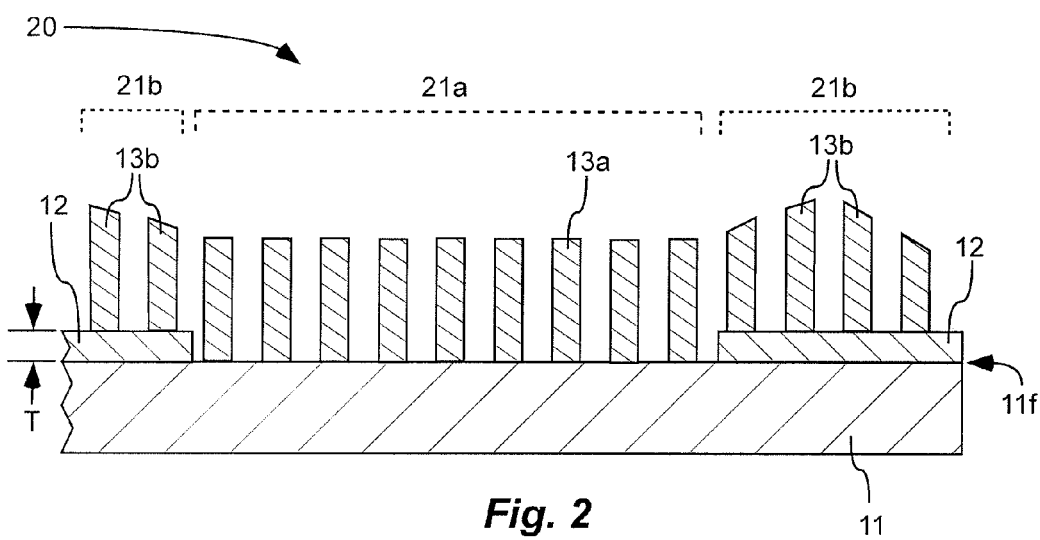
FIG. 2 is a schematic cross-sectional side view of one aspect of the wire grid polarizer of FIG. 1, with the mask material disposed between the wires and the substrate, taken along line 2-2 in FIG. 1, in accordance with an embodiment of the present invention.
Figure 3:
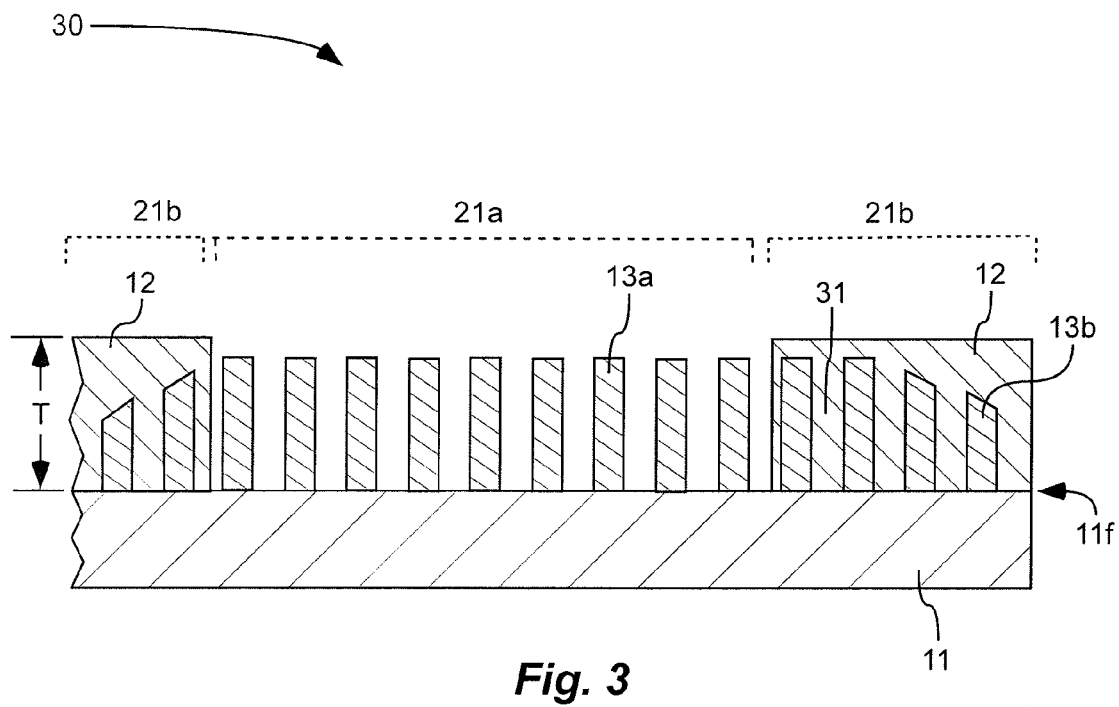
FIG. 3 is a schematic cross-sectional side of view one aspect of the wire grid polarizer of FIG. 1, with the mask material disposed over the wires, taken along line 2-2 in FIG. 1, in accordance with an embodiment of the present invention.

As illustrated in FIGS. 1-3, wire grid polarizers 10, 20, and 30 are shown comprising a substrate 11 which is transparent to incoming light and having a first surface 11$f$ and multiple separate and discrete sections 14 of wire grids disposed over the first surface 11$f$ and attached to the substrate 11. The wire grids of each section can include an array of substantially parallel, elongated wires 13 configured for polarization of incoming light. "Configured for polarization of incoming light" can mean that the wires 13 have a pitch that is less than half the wavelength of incoming light and a length longer than a wavelength of incoming light, or the light for which polarization is desired. "Configured for polarization of incoming light" can also include other wire characteristics such as wire height, wire width, wire material(s), etc, selected for polarization of the light.

Typically, there may be many separate and discrete sections 14, even thousands, but there may also be only a few. The polarizers described herein can have at least four separate and discrete sections 14 in one aspect, at least 10 separate and discrete sections 14 in another aspect, at least 100 separate and discrete sections 14 in another aspect, or at least 1000 separate and discrete sections 14 in another aspect.

A wire grid characteristic of at least one of the sections 14 can be different from a wire grid characteristic of at least one other section. The different characteristic can be a difference in wire material; a difference in coating on top of the wires; a difference in thin film between the wires and the substrate; a difference in substrate between the wires; a difference in number of layers of separate wires; a difference in angular orientation; a difference in wire cross-sectional shape wherein at least one shape is non-rectangular; a difference in pitch of at least 10 nanometers; a difference in wire width of at least 10 nanometers; and/or a difference in wire height of at least 10 nanometers. Different wire grid characteristics of different sections are described more fully in U.S. patent application Ser. No. 13/430,945. The above characteristics can be used in different sections for improved analysis of an image by allowing substantial differences in light characteristics transmitted through each section 14. Shown on wire grid polarizer 10 of FIG. 1 are different sections 14a-c. Each section 14a-c can represent a different characteristic. The different sections are represented by lines having a different angular orientation, but this different angular orientation of the lines is merely representative of a difference between the sections, and does not necessarily indicate a difference in angular orientation of the wires 13.

Also shown in FIG. 1 are two sections 14d that have six sides and two of the sides 15 of each section 14d are aligned parallel with wires of the wire grid in that section. In this section 14d, the lines do indicate the direction of the wires. This alignment of wires with the side 15 of the section 14d can be beneficial for reduced distortion of the light, especially in locations where there would have been sharp, corners (such as ~90° for example).

A border between the sections can include a mask material 12. The mask material 12 can be disposed over the first surface 11f of the substrate 11. The mask material 12 can be opaque to incoming light. The phrase "opaque to incoming light" means opaque to light for which polarization is desired, and such light can be ultraviolet, visible, or infrared, or other wavelengths of the electromagnetic spectrum, depending on the desired application. Thus, if the polarizer is used for polarization of ultraviolet light, the mask material 12 may be opaque to ultraviolet light, but might not necessarily be opaque to infrared light which might also be impinging on the polarizer.

The mask material 12 can be a material different than the wire grid material. The mask material can have a slower differential etch rate than the wires 13. The mask material 12 can be chemically resistant to chemicals used for etching the wire grids. In one aspect, the mask material 12 can comprise carbon, copper, gold, titanium, silicon, and/or tungsten. The mask material can comprise chemical compounds including the previous elements, such as for example titanium oxide, titanium nitride, silicon oxide, silicon nitride, etc. The mask material can have a thickness of between 5 and 50 nanometers.

The mask material 12 can extend over or under a portion of an edge of the wire grid. As shown on wire grid polarizer 20 of FIG. 2, the mask material 12 can extend under a portion of the wires 13b. As shown on wire grid polarizer 30 of FIG. 3, the mask material 12 can extend over a portion of the wires 13b. If the mask material 12 extends over a portion of the wires 13b, the mask material may be primarily on top of the wires. Alternatively, as shown in FIG. 3, the mask material 12 can extend between 31 the wires 13b. Whether the mask material remains primarily on top of the wires 13b or extends between 31 the wires 13b depends on the material used for the mask 12, the process of application of the mask 12, and spacing between the wires 13b.

As shown in FIGS. 2-3, wires 13a towards the center of the section tend to be relatively uniform in shape and height. Wires 13b near the edge of the section tend to be relatively distorted. The opaque mask 12 can prevent light from being transmitted through the distorted wires 13b, and thus undesirable distortion of light passing through polarizer edges can be avoided.

As shown in FIGS. 2-3, the wires can be divided into two groups or portions. The portion of the edge of the wire grid 13b having mask material 12 extending over or under defines an opaque wire grid section 21b (i.e. light can be blocked by the mask material 12 and thus not transmit through the polarizer in this section 21b). A portion of the wire grid 13a having no mask material 12 extending over or under the wire grid defines a transmissive wire grid section 21a (due to the absence of mask material 12, light can transmit through the polarizer in this section 21a). For some applications, it will be desirable to maximize the transmissive wire grid section 21a. For other applications, it is not necessary to maximize the transmissive wire grid section 21a, and thus the opaque wire grid section 21b can be relatively larger. An area of the transmissive wire grid section 21a divided by an area of the opaque wire grid section 21b can be greater than 1 in one aspect, between 2 and 1000 in another aspect, or between 1 and 1000 in another aspect.

Figure 4:
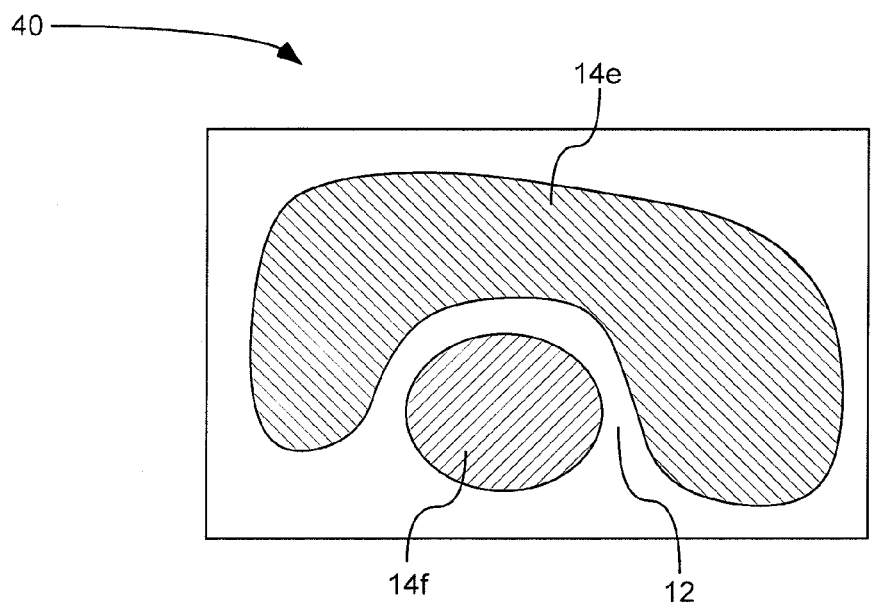
FIG. 4 is a schematic top view of a wire grid polarizer having multiple functionality sections or pixels, with a curved border between the sections, in accordance with an embodiment of the present invention.

Some applications may require a curved border to the wire grid sections 14, and may require a partial or total surrounding of one section 14 by another. A wire grid polarizer 40 with curved borders of the sections 14e-f is shown in FIG. 4. The mask 12 can define the boundaries.

Figure 5:
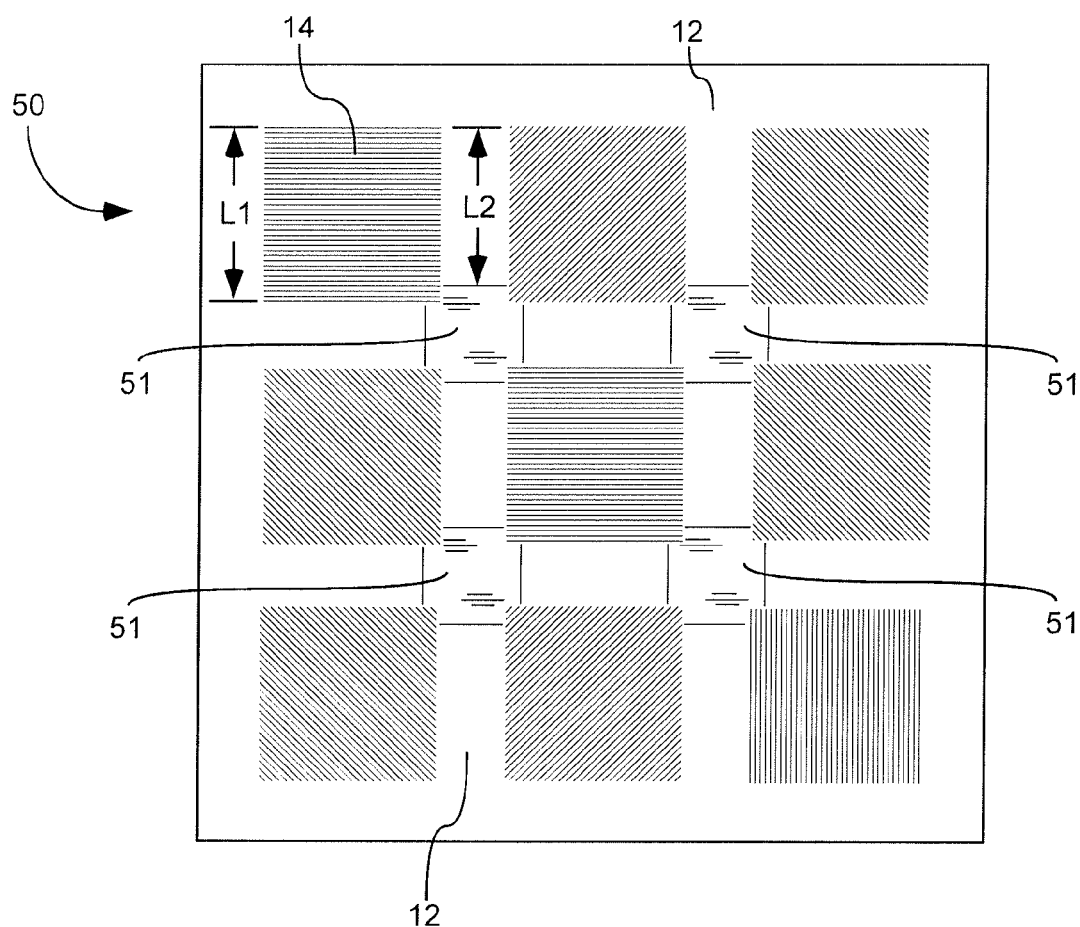
FIG. 5 is a schematic top view of a wire grid polarizer having multiple functionality sections or pixels, with a border between the sections, and wherein corners between sections of the wire grid are substantially free of mask material, in accordance with an embodiment of the present invention.

It can be difficult to manufacture properly shaped wires in corners of the sections, resulting in undesirable distortion of light in the corners. One alternative for handling this problem, as shown on wire grid polarizer 50 of FIG. 5, is to have mask material 12 only disposed along a portion of longitudinal and/or lateral lengths of the sections 14 (or longitudinal lengths of the borders), and have corners 51 between the sections 14 of wire grid that are substantially free of mask material. These corners 51 can be substrate 11 that is free of any material on top, wires from the sections, overlapping wires from different sections, or a combination of the above. Removal of the mask 12 from the corners can avoid image problems associated with an abrupt corner. The mask material 12 can be disposed along at least 80% of longitudinal and/or lateral lengths of the sections in one aspect $$\left(0.8 < \frac{L2}{L1}\right),$$

along at least 90% of longitudinal and/or lateral lengths of the sections in another aspect $$\left(0.9 < \frac{L2}{L1}\right),$$

or along at least 95% of longitudinal and/or lateral lengths of the sections in another aspect $$\left(0.95 < \frac{L2}{L1}\right).$$

Figure 6:
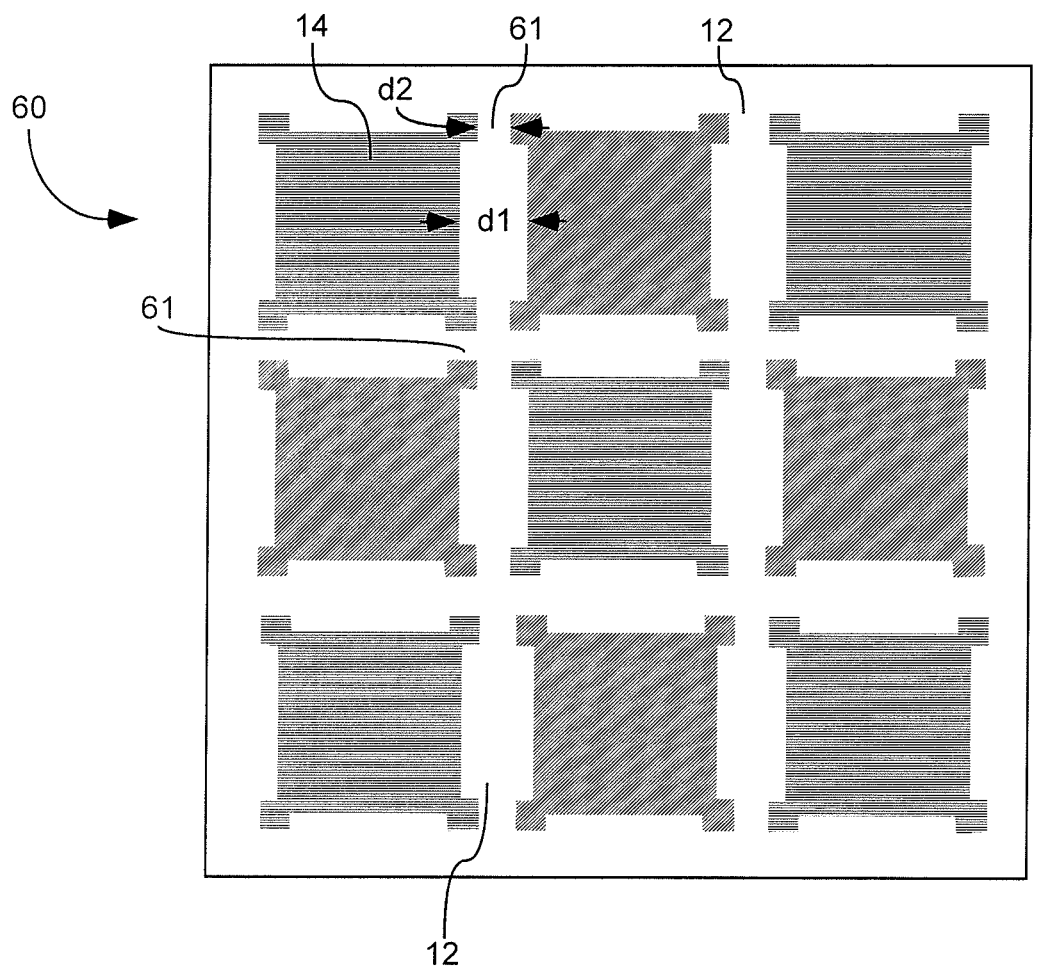
FIG. 6 is a schematic top view of a wire grid polarizer having multiple functionality sections or pixels, with a border between the sections, and wherein a diameter of intersecting junctions of the mask material is less than a diameter of mask material between longitudinal lengths of the sections, in accordance with an embodiment of the present invention.

Shown on wire grid polarizer 60 in FIG. 6 is another method for resolving the problem of distorted wires 13 at corners of the polarizer. The mask 12 can be narrowed to a smaller diameter or width at or near the corners or intersecting junctions 61 of mask material 12. A diameter d2 of intersecting junctions of the mask material divided by a diameter d1 of mask material between longitudinal lengths of the sections can be between 0.1 and 0.9 in one aspect $$\left(0.1 < \frac{d2}{d1} < 0.9\right),$$

between 0.2 and 0.8 in another aspect $$\left(0.2 < \frac{d2}{d1} < 0.8\right),$$

or between 0.3 and 0.7 in another aspect $$\left(0.3 < \frac{d2}{d1} < 0.7\right).$$

How to Make:

Wire grid polarizers with multiple functionality sections 14 can be made by masking off certain sections while leaving other sections uncovered. For example, a resist or oxide can be patterned to leave a section or multiple sections open, and other section(s) covered or masked off. Metal can be applied through sputter to the open sections. The metal can be patterned and etched. Coatings can be added if desired. The resist or oxide can be removed or lifted off. The sections that had the original wire grids can then be masked off, new sections can be opened and the procedure of adding wires can be repeated, but with different characteristics, for the new, opened, sections. This process can be repeated for as many different sections with different wire characteristics as desired.

As another example, if all wires will be made of the same metal, then the metal can first be applied to a substrate. A resist or oxide can be patterned to leave a section or multiple sections open. The metal can be patterned and etched. Coatings can be added if desired. The resist or oxide can be removed or lifted off. The sections that had the original wire grids can then be masked off, and new sections can be opened, and the procedure of adding wires can be repeated, but with different characteristics, for the new, opened, sections.

This process of masking certain sections, while forming the wires in other sections, then masking different sections, can result in misalignment of the sections. For some applications, it is especially undesirable if adjacent sections overlap. The mask material 12 of the present invention can allow for distinct boundaries between the sections. The mask material 12 can be applied, such as by chemical vapor deposition for example, then patterned. The pattern can be squares, such as sections 14*a-c* in FIG. 1, 6-sided structures, such as section 14*d* in FIG. 1, curved sections, such as section 14*e* in FIG. 4, or other shapes. The wires may be applied to the different sections as described above. Misalignment of the wire grid sections can be masked by the mask material 12. Also, distortion of the wires 13*b* at edges and/or corners can also be masked or blocked by the mask material 12. Alternatively, the wires may be applied to the different sections as described above, then the mask may be applied, such as by chemical vapor deposition for example, then patterned to open up the sections.

What is claimed is:

1. A wire grid polarizer device, comprising:
    a substrate which is transparent to incoming light and having a first surface;
    at least four separate and discrete sections of wire grids (wire grid sections) disposed over the first surface and attached to the substrate;
    the wire grids of each wire grid section including an array of substantially parallel, elongated wires configured for polarization of incoming light;
    a wire grid characteristic of at least one of the wire grid sections is different from a wire grid characteristic of at least one other wire grid section;
    a border between the wire grid sections including a mask material;
    the mask material disposed over the first surface of the substrate;
    the mask material is opaque to incoming light and is a material different than a wire grid material of at least one of the wire grid sections;
    the mask material extends over or under a portion of an edge of at least one of the wire grid sections;
    the portion of the edge of the wire grid having mask material extending over or under the edge of at least one of the wire grid sections defines an opaque wire grid section;
    a portion of at least one of the wire grid sections having no mask material extending over or under the wire grid defines a transmissive wire grid section;
    an area of the transmissive wire grid section divided by an area of the opaque wire grid section is greater than 1.

2. The polarizer of claim 1, wherein the transmissive wire grid section divided by the opaque wire grid section is between 2 and 1000.

3. The polarizer of claim 1, wherein the border is curved.

4. The polarizer of claim 1, wherein at least two of the wire grid sections have at least six sides and at least two of the sides of each wire grid section are aligned parallel with wires of the wire grid in that section.

5. The polarizer of claim 1, wherein the mask material has a thickness of between 5 and 50 nanometers.

6. The polarizer of claim 1, wherein the mask material is disposed partially between the substrate and the wires of at least one of the wire grid sections.

7. The polarizer of claim 1, wherein the mask material is chemically resistant to chemicals used for etching at least one of the wire grid sections.

8. The polarizer of claim 1, wherein the mask material comprises carbon, copper, gold, titanium, silicon, tungsten, or combinations thereof.

9. The polarizer of claim 1, wherein:
    the mask material is disposed along at least 80% of longitudinal lengths of the wire grid sections; and
    corners between the wire grid sections are substantially free of mask material.

10. The polarizer of claim 1, wherein a diameter of intersecting junctions of the mask material divided by a diameter of mask material between longitudinal lengths of the wire grid sections is between 0.1 and 0.9.

11. The polarizer of claim 1, wherein the wire grid sections include at least 1000 separate and discrete sections.

12. The polarizer of claim 1, wherein the different characteristic is
- a difference in wire material;
- a difference in coating on top of the wires;
- a difference in thin film between the wires and the substrate;
- a difference in substrate between the wires;
- a difference in number of layers of separate wires; or combinations thereof.

13. The polarizer of claim 12, wherein the different structure also includes at least one of the following:
- a difference in angular orientation;
- a difference in wire cross-sectional shape wherein at least one shape is non-rectangular;
- a difference in pitch of at least 10 nanometers;
- a difference in wire width of at least 10 nanometers; or
- a difference in wire height of at least 10 nanometers.

14. A wire grid polarizer device, comprising:
- a substrate which is transparent to incoming light and having a first surface;
- at least 10 separate and discrete sections of wire grids (wire grid sections) disposed over the first surface and attached to the substrate;
- the wire grids of each wire grid section including an array of substantially parallel, elongated wires configured for polarization of incoming light;
- a border between the wire grid sections including a mask material;
- the mask material disposed over the first surface of the substrate;
- the mask material is opaque to incoming light and is a material different than a wire grid material of the wire grids; and
- the mask material extends over or under a portion of an edge of at least one of the wire grid sections.

15. The polarizer of claim 14, wherein
- the portion of the edge of the wire grid having mask material extending over or under the edge of at least one of the wire grid sections defines an opaque wire grid section;
- a portion the edge of at least one of the wire grid sections having no mask material extending over or under the wire grid defines a transmissive wire grid section;
- an area of the transmissive wire grid section divided by an area of the opaque wire grid section is between 2 and 1000; and
- a wire grid characteristic of at least one of the wire grid sections is different from a wire grid characteristic of at least one other wire grid section and the different characteristic is:
  - a difference in wire material;
  - a difference in coating on top of the wires;
  - a difference in thin film between the wires and the substrate;
  - a difference in substrate between the wires;
  - a difference in number of layers of separate wires;
  - a difference in angular orientation;
  - a difference in wire cross-sectional shape wherein at least one shape is non-rectangular;
  - a difference in pitch of at least 10 nanometers;
  - a difference in wire width of at least 10 nanometers;
  - a difference in wire height of at least 10 nanometers; or
  - combinations thereof.

16. The polarizer of claim 14, wherein the mask material is chemically resistant to chemicals used for etching the wire grids and the mask material comprises carbon, copper, gold, titanium, silicon, tungsten, or combinations thereof.

17. A wire grid polarizer device, comprising:
- a substrate which is transparent to incoming light and having a first surface;
- at least 100 separate and discrete sections of wire grids (wire grid sections) disposed over the first surface and attached to the substrate;
- the wire grids of each section including an array of substantially parallel, elongated wires configured for polarization of incoming light;
- a wire grid characteristic of at least one of the wire grid sections is different from a wire grid characteristic of at least one other wire grid section;
- a border between the wire grid sections including a mask material;
- the mask material disposed over the first surface of the substrate;
- the mask material having a thickness of between 5 and 50 nanometers;
- the mask material is opaque to incoming light and is a material different than a wire grid material of at least one of the wire grid sections;
- the mask material extends over or under a portion of an edge of at least one of the wire grid sections;
- the portion of the edge of the wire grid having mask material extending over or under the edge of at least one of the wire grid sections defines an opaque wire grid section;
- a portion of at least one of the wire grid sections having no mask material extending over or under the wire grid defines a transmissive wire grid section;
- an area of the transmissive wire grid section divided by an area of the opaque wire grid section is between 1 and 1000.

18. The polarizer of claim 17, wherein:
- the mask material is disposed along at least 90% of longitudinal lengths of the wire grid sections; and
- corners between the wire grid sections of the wire grid are substantially free of mask material.

19. The polarizer of claim 17, wherein a diameter of intersecting junctions of the mask material divided by a diameter of mask material between longitudinal lengths of the sections is between 0.2 and 0.8.

20. The polarizer of claim 17, wherein the different characteristic is:
- a difference in wire material;
- a difference in coating on top of the wires;
- a difference in thin film between the wires and the substrate;
- a difference in substrate between the wires;
- a difference in number of layers of separate wires; or combinations thereof.

* * * * *